United States Patent [19]
Malhotra et al.

[11] Patent Number: 5,902,390
[45] Date of Patent: May 11, 1999

[54] INK COMPOSITIONS CONTAINING KETONES

[75] Inventors: Shadi L. Malhotra; Danielle C. Boils, both of Mississauga, Canada

[73] Assignee: Xerox Corporation, Stamford, Conn.

[*] Notice: This patent is subject to a terminal disclaimer.

[21] Appl. No.: 08/935,889

[22] Filed: Sep. 23, 1997

[51] Int. Cl.$^6$ ..................................................... C09D 11/00
[52] U.S. Cl. ..................................... 106/31.58; 106/31.29; 106/31.21; 106/31.86; 106/31.61
[58] Field of Search ............................ 106/31.58, 31.29, 106/31.21, 31.86, 31.61

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,017,225 | 5/1991 | Nakanishi et al. | 106/31.21 |
| 5,041,161 | 8/1991 | Cooke et al. | 106/31.58 |
| 5,069,719 | 12/1991 | Ono | 106/31.58 |
| 5,098,477 | 3/1992 | Vieira et al. | 106/31.27 |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,151,120 | 9/1992 | You et al. | 106/31.29 |
| 5,302,439 | 4/1994 | Malhotra et al. | 428/195 |
| 5,409,530 | 4/1995 | Kanbayashi et al. | 106/31.29 |
| 5,451,458 | 9/1995 | Malhotra | 428/412 |
| 5,709,976 | 1/1998 | Malhotra | 430/124 |

*Primary Examiner*—Deborah Jones
*Assistant Examiner*—Veronica Faison
*Attorney, Agent, or Firm*—E. O. Palazzo

[57] ABSTRACT

An ink comprised of (1) a liquid ketone, (2) a solid ketone, (3) a lightfastness UV absorber, (4) a lightfastness antioxidant, and (5) a colorant.

17 Claims, No Drawings

INK COMPOSITIONS CONTAINING KETONES

REFERENCE TO COPENDING PATENT APPLICATIONS AND PATENTS

Hot melt inks are illustrated in for example, U.S. Pat. No. 5,683,312, U.S. Pat. No. 5,667,568, U.S. Pat. No. 5,700,316, U.S. Pat. No. 5,747,554, and U.S. Ser. No. 641,866 (D/95458), the disclosures of each being totally incorporated herein by reference.

Also, acoustic ink compositions are illustrated in copending applications, U.S. Ser. Nos. 08/935,929, 08/933,914, 08/935,639 and 08/936,084, filed concurrently herewith, the disclosures of which are totally incorporated herein by reference.

A number of the ink components of the copending applications, such as the colorants, absorbers, antioxidants, additives, and the like may be selected for the inks of the present invention in embodiments thereof.

BACKGROUND OF THE INVENTION

The present invention is directed to ink compositions and more specifically, the present invention relates to hot melt inks with for example, a melting point of between about 25° C. and about 40° C., or from about 30 to about 35 degrees Centigrade, and which inks are especially useful for acoustic ink printing, processes and apparatuses, reference, for example, U.S. Pat. No. 5,121,141, U.S. Pat. No. 5,111,220, U.S. Pat. No. 5,128,726, and U.S. Pat. No. 5,371,531, the disclosures of which are totally incorporated herein by reference, including especially acoustic ink processes as illustrated in some of the aforementioned copending applications and patents, such as an acoustic ink printer for printing images on a record medium.

The inks of the present invention in embodiments thereof are comprised of (1) a liquid non-aqueous vehicle, such as a cyclic ketone, with a boiling point of higher than about, or equal to about 150° C. (Centigrade throughout) and lower than about, or equal to about 350° C., and more specifically from about 175 to about 325, and yet more specifically from about 225 to about 300 degrees Centigrade, and with a low acoustic loss which reduces, or minimizes energy consumption, and which acoustic loss is for example, below, or about equal to 60 dB/mm, (2) a solid additive, preferably contained in the imaging substrate, or paper pores and with a melting point of for example, lower than, or equal to about 75° C. and preferably between about 35 to about 74° C. (Centigrade) and with a low acoustic loss, and which acoustic loss is for example, below, or equal to about 100 dB/mm, (3) a light fastness UV absorber, (4) a light fastness antioxidant, (5) and a colorant such as a dye, a pigment or mixtures thereof. More specifically, the present invention is directed to semi-solid hot melt acoustic ink compositions comprised of (1) a liquid ketone vehicles with a boiling point of higher than, or equal to about 150° C. and lower than, or equal to about 350° C., and preferably between about 170 to about 300° C., and with a low acoustic loss to thereby reduce or minimize energy consumption, and which acoustic loss is below or equal to about 60 dB/mm, and preferably is in the range of between about 5 to about 40 dB/mm, (2) a solid compound, preferably a ketone, with a melting point of for example, lower than, or equal to about 75° C. and preferably between about 35 and about 74° C., with low acoustic loss to reduce, or minimize energy consumption, and which acoustic loss is below, or about equal to 100 dB/mm, and preferably in the range of from about 25 to about 80 dB/mm, (3) a UV absorber, (4) an antioxidant, and (5) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water need not be present in the invention inks, and it is preferred that there be an absence of water, and when water is not present in the inks a dryer can be avoided thereby minimizing the cost of the acoustic ink jet apparatus and processes.

PRIOR ART

In acoustic ink printing, the printhead generates approximately 2.2 picoliter droplets by an acoustic energy process. The ink under these conditions should display a melt viscosity of about 5 to about 20 centipoise or less at the jetting temperature. Furthermore, once the ink is jetted onto the paper, the ink image should be of excellent crease property, and should be nonsmearing, waterfast, of excellent transparency and excellent fix qualities. In selecting an ink for such applications, it is desirable that the vehicle display a low melt viscosity, such as from about 1 centipoise to about 25 centipoise in the acoustic head, while also possessing solid like properties after being jetted onto paper. Since the acoustic head can normally tolerate a temperature up to about 180° C., and preferably up to a temperature of from about 140° C. to about 160° C., the vehicle for the ink should preferably display liquid like properties, such as a preferred viscosity of from about 1 to about 10 centipoise at a temperature of for example, from about 75° C. to about 165° C., and solidify or harden after jetting onto paper such that the ink displays a hardness value of from about 0.1 to about 0.5 millimeter as measured with a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature, thus the ink which is melted in the apparatus will not be subject to substantial evaporation or spillage during periods of nonprinting. The vehicle selected possesses a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid having a wax-like consistency. These inks usually need to be heated, for example, to approximately 100° C. before the ink melts and converts into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their use with compact designs for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to remove moisture from the ink fast enough so that the ink does not soak into a plain paper medium. One advantage of a semi-solid hot melt ink is its ability to print on coated substrates such as coated papers and overhead transparencies yielding photographic quality images, since the semi-solid hot melt ink quickly spreads on the surface of the coated paper and transparencies.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks having an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3dimethyl-2-imidazolidone, and which solvent has permanently dissolved therein spirit soluble dyes.

U.S. Pat. No. 5,006,170 and U.S. Pat. No. 5,122,187, the disclosures of each of which are totally incorporated herein by reference, disclose semi-solid hot melt ink compositions suitable for ink jet printing which inks comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink which is semi-solid at room temperature. The inks can comprise vehicles, such as acids, aldehydes and mixtures thereof, and which are semi-solid at temperatures between 20° C. and 45° C.

U.S. Pat. No. 4,853,036 and U.S. Pat. No. 5,124,718 disclose an ink for ink jet recording which comprises a liquid composition essentially comprising a colorant, a volatile solvent with a vapor pressure of 1 millimeter Hg or more at 25° C., and a component that is solid at room temperature and with a molecular weight of 300 or more.

SUMMARY OF THE INVENTION

While known ink compositions and processes may be suitable for their intended purposes, a need remains for acoustic semi-solid hot melt ink compositions suitable for thermal ink jet printing. In addition, there is a need for semi-solid hot melt ink compositions which are compatible with a wide variety of plain papers and yield photographic quality images on coated papers. Further, there is a need for semi-solid hot melt ink compositions which generate high quality, lightfast, waterfast images on plain papers.

There is also a need for semi-solid hot melt ink jet ink compositions which generate high quality, fast-drying images on a wide variety of plain papers at low cost with high quality text and high quality graphics, and wherein the colorant, such as the dye is retained on the paper surface while the ink vehicle can continue to spread within the paper structure. Further, there is a need for semi-solid hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which exhibit excellent image permanence. Further, there is a need for semi-solid hot melt ink jet ink compositions which are suitable for use in acoustic ink jet printing processes. Additionally, there is a need for semi-solid hot ink compositions suitable for ink jet printing processes wherein the image substrate is heated prior to printing and is cooled to ambient temperature subsequent to printing (heat and delay printing processes). There is also a need for ink compositions suitable for ink jet printing wherein high optical densities can be achieved with relatively low dye concentrations. A need also remains for ink compositions suitable for ink jet printing wherein curling of the image substrate, such as paper, subsequent to printing is minimized, or avoided. These and other needs can be achievable with the inks of the present invention in embodiments thereof.

DETAILED DESCRIPTION OF THE INVENTION

In embodiments the ink compositions of the present invention comprise a colorant, such as a pigment, or dye, and a liquid vehicle with an acoustic-loss value of less than about 60 dB/mm, and preferably between about 5 and about 40 dB/mm, and a boiling point of greater than about, or equal to about 150° C., and preferably between about 170 and about 300° C. and a solid additive which primarily functions to even the surface of paper, thus for example, the ink dye will not substantially penetrate into the fibers of the paper, and which vehicle has a melting point of for example, lower than about 75° C. and preferably between about 35 and about 74° C., an acoustic-loss value of less than about 100 dB/mm and preferably between about 25 and about 80 dB/mm.

Embodiments of the present invention include a nonaqueous ink composition comprised of (1) a liquid ketone vehicle with an acoustic-loss value of from about 5 to about 40 dB/mm, (2) a solid ketone compound with a melting point of from about 35 to about 74° C. and an acoustic-loss value of from about 25 to about 80 dB/mm, (3) a lightfastness UV absorber, (4) a lightfastness antioxidant, and (5) a colorant, and which ink has an acoustic-loss value of from about 10 to about 80 dB/mm; a nonaqueous ink composition wherein the liquid ketone vehicle is present in an amount of from about 55 to about 1 percent by weight, the solid ketone compound is present in an amount of from about 5 to about 97 percent by weight, the lightfastness UV absorber is present in an amount of from about 10 to about 0.5 percent by weight, the antioxidant is present in an amount of from about 10 to about 0.5 percent by weight, and the colorant is present in an amount of from about 20 to about 1 percent by weight, wherein the total of said components is about 100 percent, and wherein said ink possesses a viscosity of from about 1 centipoise to about 10 centipoise at a temperature of from about 125° C. to about 165° C.; a nonaqueous ink wherein the liquid ketone is a cyclic ketone, or is a ketone selected from the group consisting of (1) 6-undecanone, (2) 4-ethylcyclohexanone, (3) 2-acetylcyclohexanone, (4) cyclodecanone, and (5) cis-bicclo {3.3.0.}octane-3,7-dione; a nonaqueous ink wherein the solid ketone compound with a melting point of from about 35 to about 74° C. is selected from the group consisting of nonaromatic ketones of (1) 10-nonadecanone, (2) cyclotridecanone, (3) 1,2-cyclohexanedione, (4) 1,4-cyclohexanedione mono-2,2-dimethyl trimethylene ketal, (5) tropolone, (6) 2-acetyl-1-tetralone, (7) 3-oxabicyclo [3.1.0.]hexane-2,4-dione, (8) 5-isopropyl-1,3-cyclohexanedionehydrate, (9) 1,6-dioxaspiro[4,4]nonane-2,7-dione, and (10) 3-acetyl-2-oxazolidinone; a nonaqueous ink composition wherein the solid ketone compound is a phenone compound selected from the group consisting of (1) 2'-fluoro-4'-methoxyacetophenone, (2) 2-amino-4-methylbenzophenone, (3) 4-fluorobenzophenone, (4) 3,3'-difluoro benzophenone, (5) 3,4-difluorobenzophenone, (6) decano phenone, (7) dodecanophenone, (8) tetradecanophenone, (9) hexadecanophenone, and (10) octadecanophenone; a nonaqueous ink wherein the lightfastness UV absorber is selected from the group consisting of (1) 4,4'-bis[1-propenylphenoxy]benzophenone, (2) 4-allyloxy-2-hydroxybenzo phenone, (3) 2-hydroxy-4-methoxybenzophenone, (4) 2-hydroxy-4-(octyloxy) benzophenone, and (5) 2-hydroxy-4-dodecyloxybenzophenone; an ink wherein the lightfastness group consisting of (1) triphenyl phosphite, (2) tris (nonylphenyl)phosphite, (3) tris (2,4-di-tert-butyl-phenyl) phosphite, (4) 2,2'-ethylidene-bis(4,6-di-tertbutylphenyl) fluorophosphonite, and (5) 4,4'-methylene-bis (dibutyldithiocarbamate); an ink further containing known ink additives, such as biocides, humectants, mixtures thereof and the like; a printing process which comprises incorporating into an acoustic ink jet printer the ink of the present invention, and causing droplets of the ink to be ejected in imagewise pattern onto a substrate; a process which comprises (a) providing an acoustic ink printer with a pool of the liquid ink illustrated herein and causing droplets of the ink to be ejected in imagewise pattern onto a substrate; an ink wherein the colorant is selected in an amount of from about 0.5 to about 20 percent by weight; an ink wherein the colorant is a dye; an ink wherein the colorant is a pigment; an ink wherein the colorant is a dye of cyan, magenta, yellow, black, or mixtures thereof; an ink wherein (1) the low acoustic-loss liquid acid vehicle is present in amounts of from about 40 to about 50 percent by weight, and wherein said vehicle is 6-undecanone, 4-ethylcyclohexanone, or 2-fluorobenzophenone, (2) the low acoustic- solid ketone (2) is optionally present in an amount of about 35 to about 45 percent by weight and is hexadecanophenone, octadecano phenone, 5-isopropyl-1,3-cyclohexanedionehydrate, or 1,6-dioxaspiro[4,4]nonane-2,7-dione, (3) the lightfastness UV absorber is present in an amount of from about 1 to about 4 percent by weight and is 2-hydroxy-4-(octyloxy) benzophenone, or 2-hydroxy-4-dodecyloxy benzophenone, (4) the lightfastness antioxidant is present in an amount of from about 1 to about 4 percent by weight and is 2,2'-ethylidene-bis(4,6-di-tert-butylphenyl) fluoro phosphonite, and the colorant is present in an amount of form about 2 to about 10 weight percent, and wherein the total of said ink components is equal to about 100 percent; an ink with a viscosity of from about 1 centipoise to about 10 centipoise and an acoustic loss of from about 20 to about 70 dB/mm; an ink comprised of (1) a liquid ketone, (2) a solid ketone, (3) a lightfastness UV absorber, (4) a lightfastness antioxidant, and (5) a colorant; an ink with an acoustic-loss value of from about 10 to about 80 dB/mm, and which ink possesses a viscosity of from about 1 centipoise to about 20 centipoise at a temperature of from about 125° C. to about 165° C.; a printing process which comprises incorporating into an acoustic ink jet printer the ink of claim 18 and causing droplets of the ink to be ejected in imagewise pattern onto a substrate; a process which comprises (a) providing an acoustic ink printer having a pool of the liquid ink of claim 1 with a free surface, and a printhead including at least one droplet ejector for radiating the free surface of said ink with focused acoustic radiation to eject individual droplets of said ink therefrom on demand, said radiation being brought to focus with a finite waist diameter in a focal plane, and causing droplets of the ink to be ejected in imagewise pattern onto a substrate; and an ink wherein said liquid ketone possesses an acoustic-loss value of from about 10 to about 25 dB/mm, (2) said solid ketone compound possesses a melting point of from about 45 to about 60° C. and an acoustic-loss value of from about 35 to about 65 dB/mm, and wherein said ink possesses an acoustic-loss value of from about 25 to about 65 dB/mm.

The liquid vehicle which is preferably a ketone, such as a cyclic ketone, with a boiling point of for example higher than, or equal to about 150° C. and preferably between about 170 and about 300° C. and with an acoustic-loss value of from for example,about 5 to about 40 dB/mm is present in the ink composition in a suitable amount, for example, in an amount of from about 55 to about 1 percent by weight, or parts, the solid additive, preferably a solid ketone with a melting point of for example, between about 35 to about 74° C., and with an acoustic-loss value of below about 100 dB/mm and for example from about 25 to about 80 dB/mm is present in an amount of for example, from about 5 to about 97 percent by weight, the UV absorber is for example, present in an amount of from about 10 to about 0.5 percent by weight, the antioxidant is for example, present in an amount of from about 10 to about 0.5 percent by weight, and the colorant is present for example in an amount of from about 20 to about 1, or from about 2 to about 12 percent by weight and wherein the total of all the ink componets is about 100 percent, or 100 parts. The ink composition containing (1) a low acoustic-loss vehicle, (2) the solid ketone additive, (3) the lightfast UV absorber, (4) the lightfast antioxidant, and (5) the colorant, has for example, the following amount ranges in embodiments in the sequence (1), (2), (3), (4), (5), [55+5+10+10+20=100] to [1+97+0.5+0.5+1=100]. [1+97+0.5+1=100].

In embodiments a liquid ketone vehicle is selected with a boiling point of higher than 150° C. and preferably between about 170 to about 300° C. and with an acoustic-loss value of from about 5 to about 40 dB/mm and is present in suitable amount of for example, from about 50 to about 20 percent by weight, the solid ketone compound possesses a melting point of less than about 75° C. and preferably has a melting point of between about 35 to about 74° C., and with an acoustic-loss value of below about 100 dB/mm and preferably from about 25 to about 80 dB/mm is present in an amount of for example, from about 30 to about 78 percent by weight, the UV absorber is present for example, in an amount of from about 5 to about 0.5 percent by weight, the antioxidant is for example, present in an amount of from about 5 to about 0.5 percent by weight, and the colorant is present in an amount of from about 10 to about 1 percent by weight. The ink composition containing (1) the liquid ketone vehicle, (2) the solid ketone additive, (3) the lightfast UV absorber, (4) the lightfast antioxidant, and (5) a colorant, can contain the following range amounts in the aforementioned sequence: [50+30+5+5+10=100] to [20+78+0.5+0.5+1= 100]. These composition ranges were established using a statistical design based on the experimental data of viscosity at 150° C., jettability at 150° C., image quality, lightfastness, and waterfastness.

Examples of the (1) liquid ketone vehicles Include: (1) 2nonanone, (2) 3-nonanone, (3) 2-decanone, (4) 2-undecanone, (5) 6-undecanone, (4)4-ethylcyclo hexanone, (6) 2-acetyl cyclohexanone, (7) cycloheptanone, (8) cyclodecanone, (9) cycloundecanone, (10) 8-cyclohexadecen-1-one, (11) acetophenone, (12) chloroacetophenone, (13) methoxyacetophenone, (14) trimethoxyacetophenone, (15) tri methylacetophenone, (16) 4'-fluoroacetophenone, (17) butyrophenone, (18) isobutyrophenone, (19) octanophenone, (20) benzophenone, (21) 2-fluorobenzophenone, (22) 2,4'-difluorobenzophenone, (23) carvone, all available from Aldrich chemicals; (24) damascenone, (CAS# 23696-85-7;CAS# 23726-93-4), (25) muscone, (CAS# 541-91-3), (26) eremophilone, (CAS# 562-23-2), (27) nootkatone, (CAS# 4674-50-4), (28) 6-amyl-α-pyrone, (CAS# 27593-23-3), (29) (6-methyl-α-ionone, (CAS# 79-69-6), and (30) trans-α-ionone, (CAS# 127-41-3).

Examples of solid ketone compounds include for example: (1) 8-pentadecanone, (2) 9-heptadecanone, (3) 10-nonadecanone, (4) cyclononanone, (5) cyclotridecanone, (6) 1,2-cyclohexanedione, (7) cyclooctanone, (8) 1,4-cyclohexane dione mono-2,2-dimethyl trimethylene ketal, (9) tropolone, (10) 2-acetyl-1-tetralone, (11) 2-phenylcyclohexanone, (12) (±)-3-methyl-2-pyrrolidinone, (13) 3-oxabicyclo [3.1.0.]hexane-2,4-dione, (14) cyclododecanone, (15) 1,3,5-trioxane, (16) 5-isopropyl-1,3-cyclohexanedione hydrate, (17) cyclopentadecanone, (18) butadiene sulfone, (19) 1,6-dioxaspiro [4,4]nonane-2,7-dione, (20) 3-acetyl-2-oxazolidinone, all available from Aldrich chemicals.

Solid ketones include phenone compounds such as for example: (1) 2-chloro aceto phenone, (2) bromoacetophenone, (3) 4'-ethoxyacetophenone, (4) dimethoxy acetophenone, (5) 2'-hydroxy-5'-methylacetophenone, (6) 2'-hydroxy-4'-methoxy acetophenone, (7) phenoxyacetophenone, (8) bromomethoxyacetophenone, (9) trichloroacetophenone, (10) fluoromethoxyacetophenone, (11) 4'-cyclohexylacetophenone, (12) hydroxybenzophenone, (13) 2-amino-4-methylbenzophenone, (14) methoxybenzophenone, (15) chlorobenzophenone, (16) fluorobenzophenone, (17) difluorobenzophenone, (18) dimethylbenzophenone, (19) acetonaphthone, (20) decanophenone, (21) dodecanophenone, (22) tetradecanophenoe, (23) hexa decanophenone, and (24) octadecanophenone, all available from Aldrich chemicals.

UV lightfastness compounds or components include phenone compounds such as example, (1) 4,4'-bis[1-propenylphenoxy]benzophenone, (2) 4-allyloxy-2-hydroxy benzophenone, (3) 2-hydroxy-4-methoxybenzophenone, (4) 2-hydroxy-4-(octyloxy) benzophenone, all (1) to (4) available from Aldrich chemicals, (5) 2-hydroxy-4-dodecyloxybenzophenone, available from Eastman Chemicals, and the like.

Antioxidant lightfast compounds include for example, (1) triphenyl phosphite, (2) tris(nonylphenyl)phosphite, both available from Harcros Corporation, (3) tris(2,4-di-tert-butyl-phenyl)phosphite, Olin Corporation, (4) 2,2'-ethylidene-bis(4,6-di-tert-butylphenyl)fluorophosphonite, Ethyl Corporation, and (5) 4,4'-methylene-bis (dibutyidithiocarbamate), Vanderbilt Corporation, and the like.

Other UV absorbers and antoixants can be selected for the inks of the present invention in embodiments thereof.

Suitable colorants, present in an effective amount generally of from about 1 to about 20 percent, about 2 to about 12, about 2 to about 10, and the like by weight, include pigments and dyes, pigments, dyes, mixtures of pigments, mixtures of dyes, and the like with solvent dyes being preferred. Generally any suitbale dye or pigment may be selected, providing for example, that it is capable of being dispersed or dissolved in the liquid vehicle, such as the liquid ketone, and is compatible with the other ink components. Colorants include pigments, dyes, mixtures thereof, mixtures of pigments, mixtures of dyes, and the like.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D.Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (CibaGeigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite BlueBCA (Ciba-Geigy), Paliogen Blue 6470 (BASF), Sudan II((Red Orange), (Matheson, Colemen Bell), Sudan I(( Orange), (Matheson, Colemen Bell), Sudan Orange G (Aldrich), Sudan Orange 220 (BASF), Paliogen Orange 3040 (BASF), Ortho Orange OR 2673(Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330 ® (Cabot), Carbon Black 5250, Carbon Black 5750(Columbia Chemical Company).

Examples of suitable dyes include Pontamine; Food Black 2; Carodirect Turquoise FBL Supra Conc.(Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red # 28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow # 5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow # 10 (Acid Yellow 3), available from Tricon; Yellow Shade 16948, available from Tricon; Basacid Black X 34, available from BASF; Carta Black 2GT, available from Sandoz, Inc.; and the like.

Particularly preferred are solvent dyes, and within the class of solvent dyes, spirit soluble dyes are preferred primarily because of their compatibility with the ink vehicle. Examples of suitable spirit solvent dyes include Neozapon Red 492 (BASF), Orasol Red G (Ciba-Geigy), Direct Brilliant Pink B (Crompton-Knolls), Aizen Spilon Red C- BH (Hodagaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RLP(Ciba-Geigy), Savinyl Black RLS (Sandoz), Dermacarbon 2GT(Sandoz), Pyrazol Black BG (ICI), Morfast Black Conc.A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

Optional ink additives include biocides such as Dowicil 150, 200, and 75, benzoate salts, sorbate salts, and the like, present in effective amounts, such as for example from about 0.001 to about 4 percent by weight, and preferably from about 0.01 to about 2.0 percent by weight; pH controlling agents such as acids, or bases, phosphate salts, carboxylates salts, sulfite salts, amine salts, and the like, present, for example, in an amount of from 0 to about 1 percent by weight and preferably from about 0.01 to about 1 percent by weight, based on the weight of the ink components. The amount of biocide is generally present in amounts of from about 10 to 25 milligrams per one gram of ink. Other ink additives, such as humectants and the like may also be selected for the invention inks in embodiments thereof.

The inks of the present invention can be prepared by any suitable method. A colored invention semi-solid hot melt ink composition can be prepared by mixing 46 percent by weight of a liquid ketone vehicle having an acoustic-loss value of about 5 to about 40 dB/mm and a boiling point of greater than 150° C., 42 percent by weight of the ketone additive having a melting point of from about 35 to 74° C. and an acoustic-loss value of less than about 100 dB/mm, 3 percent by weight of a lightfastness UV absorber, 3 percent by weight of lightfast antioxidant and 6 percent by weight of a colorant. The mixture can then be heated to a temperature of about 100° C. and stirred for a period of about 60 minutes until there is formed a homogeneous solution, and subsequently the mixture can be cooled to about 25° C.

The inks of the present invention are particularly suitable for printing processes wherein the substrate, such as paper, transparency material, or the like, is heated during the printing process to facilitate is formation of the liquid crystalline phase within the ink. When transparency substrates are employed, temperatures typically are at a maximum of about 100° C. to about 110° C., since the polyester typically employed as the base sheet in the transparency tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges. Also, the inks of the present invention can be selected for acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (for example, the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. This causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

The size of the ejection orifice is an important design parameter of an ink jet because it determines for example, the size of the droplets of ink that the jet ejects. As a result, the size of the ejection orifice should not be increased as image resolution may decrease. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl Phys.*, vol. 65, no. 9 (May 1, 1989) and references therein, the disclosure of which is totally incorporated herein by reference.

Acoustic-loss Measurements recited herein were measured as follows: samples, for example about 5 to 10 grams, of various liquid ketone vehicles and solid ketone compounds were placed between two transducers with the temperature set at 150° C. The samples were permitted to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same component were measured. The attenuation dB/mm was then calculated by ratioing the amplitude values obtained at different separation distances. The liquid ketones of the present application preferably had dB/mm values of from about 20 to 40, and the solid ketones preferably possessed dB/mm values of about 40 to about 55. A value of less than about 80 dB/mm for the ink composition is an important factor for acoustic jetting.

The optical density measurements recited herein were obtained on a Pacifiopectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfast values of the ink jet images were measured in the Mark V Lightfast Tester obtained from Microscal Company, London, England.

The waterfast values of the ink jet images were obtained from the optical density data recorded before and after washing with hot [50° C.] water for two minutes.

Specific embodiments of the invention will now be described in detail. These examples are intended to be illustrative, and the invention is not limited to the materials, conditions, or process parameters set forth in these embodiments. All parts and percentages are by weight unless otherwise indicated. Temperatures are in degrees Centigrade.

EXAMPLE 1

A black semi-solid hot melt ink composition was prepared by mixing 46 percent by weight of the liquid ketone vehicle 6-undecanone, or cis-bicyclo{3.3.0.} octane-3,7-dione, (Aldrich # 13,699-9), with an acoustic-loss value of 22 dB/mm and a boiling point of 228° C., 42 percent by weight of the solid paper additive 5-isopropyl-1,3-cyclohexanedione hydrate, (Aldrich#34,344-7), with a melting point of 64° C. (Centigrade throughout) and an acoustic-loss value of 37 dB/mm, 3 percent by weight of the UV absorber 2-hydroxy-4-(octyloxy) benzophenone, available as Cyasorb UV-531, #41,315-1, from Aldrich Chemical Company, 3 percent by weight of the antioxidant 2,2'-ethylidenebis(4,6-di-tert-butylphenyl)fluoro phosphonite, available as Ethanox 398 from Ethyl Corporation, and 6 percent by weight of the colorant Orasol Black RLP (Ciba-Geigy). The resulting mixture was heated to a temperature of about 100° C. and then stirred for a period of about 60 minutes until it formed a homogeneous solution, and subsequently the solution was cooled to 25° C. The resulting black ink had an acoustic loss value of 45 dB/mm and a viscosity of 5 cps at 150° C.

EXAMPLE 2

A blue semi-solid hot melt ink composition was prepared by mixing 46 percent by weight of the liquid vehicle 4-ethyl cyclohexanone, (Aldrich#12,938-0), and which vehicle had an acoustic-loss value of 23 dB/mm and a boiling point of 1940° C., 42 percent by weight of the solid ketone 1,6-dioxaspiro [4,4]nonane-2,7-dione, (Aldrich# 27,197-7), with a melting point of 70° C. and an acoustic-loss value of 40 dB/mm, 3 percent by weight of the UV absorber 2-hydroxy-4-(octyloxy) benzophenone, available as Cyasorb UV-531, #41,315-1, from Aldrich Chemical Company, 3 percent by weight of the antioxidant 2,2'-ethylidene-bis (4,6-di-tert-butylphenyl) fluoro phosphonite, available as Ethanox 398 from Ethyl Corporation and 6 percent by weight of a colorant Sudan Blue dye (BASF). The resulting mixture was heated to a temperature of about 100° C. and stirred for a period of about 60 minutes until it formed a homogeneous solution, and subsequently it was cooled to 25° C. The resulting blue ink had an acoustic loss value of 45 dB/mm and a viscosity of 5.2 cps at 150° C.

EXAMPLE 3

A yellow semi-solid hot melt ink composition was prepared by mixing 46 percent by weight of the liquid vehicle 4-ethyl cyclohexanone (Aldrich#12,938-0), with an acoustic-loss value of 25 dB/mm and a boiling point of 194° C., 42 percent by weight of the solid ketone additive 1,6-dioxaspiro [4,4] nonane-2,7-dione, (Aldrich# 27,197-7), with a melting point of 70° C. and an acoustic-loss value of 40 dB/mm, 3 percent by weight of the UV absorber 2hydroxy-4-(octyloxy)benzophenone, available as Cyasorb UV-531, #41,315-1, from Aldrich Chemical Company, 3 percent by weight of the antioxidant 2,2'-ethylidene-bis(4,6-di-tert-butylphenyl) fluoro phosphonite, available as Ethanox 398, from Ethyl Corporation, and 6 percent by weight of the colorant Sudan yellow dye (BASF). The resulting mixture was heated to a temperature of about 100° C. and then stirred for a period of about 60 minutes until it formed a homogeneous solution, and the solution was cooled to 25° C. The resulting yellow ink possessed an acoustic loss value of 48 dB/mm and a viscosity of 4.54 cps at 150° C.

EXAMPLE 4

A red semi-solid hot melt ink composition was prepared by mixing 46 percent by weight of the liquid vehicle 2-fluorobenzophenone, (Aldrich#F,700-8), with an acoustic-loss value of 28 dB/mm and a boiling point of 190° C./29 mm, 42 percent by weight of the solid ketone 1,6-dioxaspiro[4,4] nonane-2,7-dione, (Aldrich# 27,197-7), having a melting point of 70° C. and an acoustic-loss value of 40 dB/mm, 3 percent by weight of the UV absorber 2hydroxy-4-(octyloxy)benzophenone, available as Cyasorb UV-531, #41,315-1, from Aldrich Chemical Company, and 3 percent by weight of the antioxidant 2,2'-ethylidene-bis(4,6-di-tert-butylphenyl) fluoro phosphonite, available as Ethanox 398, from Ethyl Corporation and 6 percent by weight of the colorant Sudan Red dye (BASF). The resulting mixture was heated to a temperature of about 100° C. and then stirred for a period of about 60 minutes until it formed a homogeneous solution, and the solution was cooled to 25° C. The resulting red ink had an acoustic loss value of 45 dB/mm and a viscosity of 5.2 cps at 150° C.

Each of the above prepared four inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.68 (Black), 1.61 (cyan), 1.37 (magenta), 0.92 (yellow), and sharp edges, with lightfastness and waterfastness values of 99 percent.

EXAMPLE 5

A black semi-solid hot melt ink composition was prepared by mixing 46 percent by weight of the liquid ketone vehicle 2-fluorobenzophenone, (Aldrich#F,700-8), with an acoustic-loss value of 28 dB/mm and a boiling point of 190° C./29 mm, 42 percent by weight of the solid ketone additive hexadecanophenone, (Aldrich#31,978-3), with a melting point of 63° C., 3 percent by weight of the UV absorber 2-hydroxy-4-dodecyloxy benzophenone, available as DOBP, from Eastman Chemicals, 3 percent by weight of the antioxidant 4,4'-methylene-bis(dibutyidithiocarbamate), Vanlube 7723, from Vanderbilt Corporation, and 6 percent by weight of the colorant Orasol Black RLP (Ciba-Geigy). The resulting mixture was heated to a temperature of about 100° C. and then stirred for a period of about 60 minutes until it formed a homogeneous solution, and subsequently the solution was cooled to 25° C. The resulting black ink possessed an acoustic loss value of 46 dB/mm and a viscosity of 5.1 cps at 150° C.

EXAMPLE 6

A blue semi-solid hot melt ink composition was prepared by mixing 46 percent by weight of the liquid vehicle 6-undecanone, (Aldrich # 13,699-9), with an acoustic-loss value of 22 dB/mm and a boiling point of 228° C., 42 percent by weight of the solid additive octa decanophenone, (Aldrich # 31,841-8), with a melting point of 66° C. and an acoustic-loss value of 42 dB/mm, 3 percent by weight of the UV absorber 2-hydroxy-4-dodecyloxy benzophenone, available as DOBP, from Eastman Chemicals, 3 percent by weight of the antioxidant 4,4'-methylene-bis (dibutyldithiocarbamate), Vanlube 7723, from Vanderbilt Corporation, and 6 percent by weight of the colorant Sudan Blue dye (BASF). The resulting mixture was heated to a temperature of about 100° C. and stirred for a period of about 60 minutes until it formed a homogeneous solution, and subsequently the solution was cooled to 25° C. The resulting blue ink had an acoustic loss value of 41 dB/mm and a viscosity of 5.1 cps at 150° C.

EXAMPLE 7

A yellow semi-solid hot melt ink composition was prepared by mixing 46 percent by weight of the liquid ketone vehicle 6-undecanone, (Aldrich # 13,699-9), having an acoustic-loss value of 22 dB/mm and a boiling point of 228° C., 42 percent by weight of the solid ketone octa decanophenone, (Aldrich # 31,841-8) with a melting point of 66° C. and an acoustic-loss value of 42 dB/mm, 3 percent by weight of the UV absorber 2-hydroxy-4-dodecyloxy benzophenone, available as DOBP, from Eastman Chemicals, 3 percent by weight of the antioxidant 4,4'-methylene-bis(dibutyldithiocarbamate), Vanlube 7723, obtained from Vanderbilt Corporation and 6 percent by weight of the colorant Sudan yellow dye (BASF). The mixture was heated to a temperature of about 100° C. and then stirred for a period of about 60 minutes until it formed a homogeneous solution, and subsequently the solution was cooled to 25° C. The resulting yellow ink had an acoustic loss value of 47 dB/mm and a viscosity of 4.9 cps at 150° C.

EXAMPLE 8

A red semi-solid hot melt ink composition was prepared by mixing 46 percent by weight of the liquid vehicle 2-fluorobenzo phenone, (Aldrich#F,700-8), with an acoustic-loss value of 28 dB/mm and a boiling point of 190° C./29 mm, 42 percent by weight of the solid additive hexadecanophenone, (Aldrich#31,978-3), with a melting point of 63° C. and an acoustic-loss value of 40 dB/mm, 3 percent by weight of the UV absorber 2hydroxy-4-dodecyloxy benzophenone, available as DOBP, from Eastman Chemicals, 3 percent by weight of the antioxidant 4,4'-methylene-bis(dibutyidithiocarbamate), Vanlube 7723, available from Vanderbilt Corporation and 6 percent by weight of the colorant Sudan Red dye (BASF). The mixture was heated to a temperature of about 100° C. and then stirred for a period of about 60 minutes until it formed a homogeneous solution, and thereafter the solution was cooled to 25° C. The resulting red ink had an acoustic loss value of 45 dB/mm and a viscosity of 4.85 cps at 150° C.

Each of the above prepared four inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.58 (black), 1.65 (cyan), 1.30 (magenta), 0.93 (yellow), and sharp edges, with lightfastness and waterfastness values of about 98 percent, and more specifically 98.3 percent Other modifications of the present invention may occur to those of ordinary skill in the art subsequent to a review of the present application, and these modifications, including equivalents thereof, are intended to be included within the scope of the present invention.

What is claimed is:

1. A nonaqueous ink composition comprised of (1) a liquid ketone vehicle with an acoustic-loss value of from about 5 to about 40 dB/mm, (2) a solid ketone compound with a melting point of from about 35 to about 74° C. and an acoustic-loss value of from about 25 to about 80 dB/mm, (3) a lightfastness UV absorber, (4) a lightfastness antioxidant, and (5) a colorant, and which ink has an acoustic-loss value of from about 10 to about 80 dB/mm.

2. A nonaqueous ink composition in accordance with claim 1 wherein the liquid ketone vehicle is present in an amount of from about 55 to about 1 percent by weight, the solid ketone compound is present in an amount of from about 5 to about 97 percent by weight, the lightfastness UV absorber is present in an amount of from about 10 to about 0.5 percent by weight, the antioxidant is present in an amount of from about 10 to about 0.5 percent by weight, and the colorant is present in an amount of from about 20 to about 1 percent by weight, wherein the total of said components is about 100 percent, and wherein said ink possesses a viscosity of from about 1 centipoise to about 10 centipoise at a temperature of from about 125° C. to about 165° C.

3. A nonaqueous ink composition in accordance with claim 1 wherein the liquid ketone is selected from the group consisting of (1) 6-undecanone, (2) 4-ethylcyclohexanone, (3) 2-acetylcyclohexanone, (4) cyclodecanone, and (5) cis-bicclo {3.3.0.}octane-3,7-dione.

4. A nonaqueous ink composition in accordance with claim 1 wherein the solid ketone compound with a melting point of from about 35 to about 74° C. is selected from the group consisting of nonaromatic ketones of (1) 10-nonadecanone, (2) cyclotridecanone, (3)1,2-cyclohexanedione, (4) 1,4-cyclohexanedione mono-2,2-dimethyl trimethylene ketal, (5) tropolone, (6) 2-acetyl-1-tetralone, (7) 3-oxabicyclo [3.1.0.]hexane-2,4-dione, (8) 5-isopropyl-1,3-cyclohexanedionehydrate, (9) 1,6-dioxaspiro[4,4]nonane-2,7-dione, and (10) 3acetyl-2-oxazolidinone.

5. A nonaqueous ink composition in accordance with claim 1 wherein the solid ketone compound is a phenone compound selected from the group consisting of (1) 2'-fluoro-4'-methoxyaceto phenone, (2) 2-amino-4-methylbenzophenone, (3) 4-fluorobenzophenone, (4) 3,3'-difluorobenzophenone, 5) 3,4-difluorobenzophenone, (6) decano phenone, (7) dodecanophenone, (8) tetradecanophenone, (9) hexadecano phenone, and (10) octadecano phenone.

6. A nonaqueous ink in accordance with claim 1 wherein the lightfastness UV absorber is selected from the group consisting of (1) 4,4'-bis[1-propenylphenoxy] benzophenone, (2) 4-allyloxy-2-hydroxybenzo phenone, (3) 2hydroxy-4-methoxy-benzophenone, (4) 2-hydroxy-4-(octyloxy) benzophenone, and (5) 2-hydroxy-4-dodecyloxy benzophenone.

7. An ink in accordance with claim 1 wherein the lightfastness antioxidant is selected from the group consisting of (1) triphenyl phosphite, (2) tris(nonylphenyl)phosphite, (3) tris (2,4-di-tert-butyl-phenyl)phosphite, (4) 2,2'-ethylidene-bis(4,6-di-tertbutylphenyl)fluorophosphonite, and (5) 4,4'-methylene-bis(dibutyldithiocarbamate).

8. A printing process which comprises incorporating into an acoustic ink jet printer the ink of claim 1, and causing droplets of the ink to be ejected in imagewise pattern onto a substrate.

9. A process which comprises (a) providing an acoustic ink printer with a pool of the liquid ink of claim 1 and causing droplets of the ink to be ejected in imagewise pattern onto a substrate.

10. An ink in accordance with claim 1 wherein the colorant is present in an amount of from about 0.5 to about 20 percent by weight.

11. An ink in accordance with claim 1 wherein the colorant is a dye.

12. An ink in accordance with claim 1 wherein the colorant is a pigment.

13. An ink in accordance with claim 1 wherein the colorant is a dye of cyan, magenta, yellow, black, or mixtures thereof.

14. An ink in accordance with claim 1 wherein (1) the low acoustic-loss liquid acid vehicle is present in amounts of from about 40 to about 50 percent by weight, and wherein said vehicle is 6-undecanone, 4-ethylcyclohexanone, or 2-fluorobenzophenone, (2) the low acoustic- solid ketone, is present in an amount of about 35 to about 45 percent by weight and is hexadecanophenone, octadecano phenone, 5-isopropyl-1,3-cyciohexanedionehydrate, or 1,6-dioxaspiro[4,4]nonane-2,7-dione, (3) the lightfastness UV absorber is present in an amount of from about 1 to about 4 percent by weight and is 2-hydroxy-4-(octyloxy) benzophenone, or 2-hydroxy-4-dodecyloxy benzophenone, (4) the lightfastness antioxidant is present in an amount of from about 1 to about 4 percent by weight and is 2,2'-ethylidene-bis(4,6-di-tert-butylphenyl) fluoro phosphonite, and the colorant is present in an amount of from about 2 to about 10 weight percent, and wherein the total of said ink components is equal to about 100 percent.

15. An ink in accordance with claim 1 with a viscosity of from about 1 centipoise to about 10 centipoise and an acoustic loss of from about 20 to about 70 dB/mm.

16. A process which comprises (a) providing an acoustic ink printer having a pool of the liquid ink of claim 1 with a free surface, and a printhead including at least one droplet ejector for radiating the free surface of said ink with focused acoustic radiation to eject individual droplets of said ink therefrom on demand, said radiation being brought to focus with a finite waist diameter in a focal plane, and causing droplets of the ink to be ejected in imagewise pattern onto a substrate.

17. An ink in accordance with claim 1 wherein said liquid ketone possesses an acoustic-loss value of from about 10 to about 25 dB/mm, (2) said solid ketone compound possesses a melting point of from about 45 to about 60° C. and an acoustic-loss value of from about 35 to about 65 dB/mm, and wherein said ink possesses an acoustic-loss value of from about 25 to about 65 dB/mm.

* * * * *